United States Patent [19]

Pignocco et al.

[11] 4,182,639

[45] Jan. 8, 1980

[54] METHOD FOR IMPROVING THE ADHESION OF BRASS-COATED STEEL CORD TO RUBBER

[75] Inventors: Arthur J. Pignocco, Murrysville Boro; Michael E. Waitlevertch, North Huntingdon Township, Westmoreland County, both of Pa.

[73] Assignee: United States Steel Corporation, Pittsburgh, Pa.

[21] Appl. No.: 958,457

[22] Filed: Nov. 6, 1978

[51] Int. Cl.² .............................. C23F 7/12; B60C 9/16
[52] U.S. Cl. .................................. 148/6.17; 428/381; 428/382; 427/405; 427/409; 427/413; 156/110 C; 156/124; 156/110 A; 148/31.5
[58] Field of Search ............... 428/381, 382, 389, 390; 148/6.24, 6.17; 156/110 A, 110 C, 124; 427/405, 409, 413

[56] References Cited

U.S. PATENT DOCUMENTS

| 2,272,216 | 2/1942 | Lodeesen | 148/6.17 X |
|---|---|---|---|
| 3,846,160 | 11/1974 | Hirakawa et al. | 428/382 |
| 3,936,536 | 2/1976 | Brock | 428/398 |
| 3,996,074 | 12/1976 | Rakestraw et al. | 428/382 |
| 4,048,374 | 9/1977 | Kötzsch | 427/413 |

*Primary Examiner*—Ralph S. Kendall
*Attorney, Agent, or Firm*—William L. Krayer

[57] ABSTRACT

Brass-coated steel cord is provided with improved adhesive characteristics for use in tire making, by coating it with certain combinations of sulfur-containing accelerators and phosphate corrosion inhibitors.

10 Claims, No Drawings

METHOD FOR IMPROVING THE ADHESION OF BRASS-COATED STEEL CORD TO RUBBER

BACKGROUND OF THE INVENTION

Prior to this invention, it has been known to use brass-coated steel cord for tire reinforcement. Difficulties have been encountered, however, in that occasionally the cord is not sufficiently adhered or adequately fixed in place in the rubber after curing. If the adhesion of the brass-coated steel cord to the rubber is not secure, the tire may tend to come apart in use. See, for example, Belgian Pat. Nos. 849,928 and 849,929, wherein a coating is disclosed for protecting a brass/steel cord from corrosion and to improve the adhesion.

SUMMARY OF THE INVENTION

We have discovered that significant improvements in adhesion of brass-coated steel cord to rubber may be achieved through the use of certain compositions and techniques for applying them to the cord. We employ inorganic or organic phosphates, preferably tricresylphosphate, and various sulfur-containing rubber vulcanization accelerating agents. The accelerators are believed to interact with ZnO to form complexed zinc perthiomercaptides, and the perthiomercaptide is believed to be the active sulfurating agent that reacts with and bonds to the rubber hydrocarbon. The surface of a typical 70/30 brass (70% copper, 30% zinc) contains ZnO, and after the reaction of accelerator and ZnO is completed, the remaining active copper sites on the brass are covered or rendered inert by treatment with corrosion inhibitors or other such treatment. As a result of such treatments, the brass surface then contains the proper number of reactive polysulfide pendant groups, which are free to interact with and bond to the rubber compound. The number of reactive polysulfide pendant groups on the brass surface controls the extent of the interaction of the cord with the rubber because none or relatively few copper sites remain active on the cord.

Typical sulfur-containing accelerators which may be used in this invention include:

Benzothiazyldisulfide, or mercaptobenzothiazyldisulfide (MBTS)

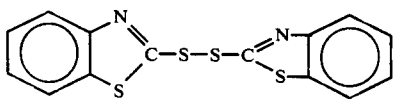

N-oxydiethylene-2-benzothiazylsulfenamide

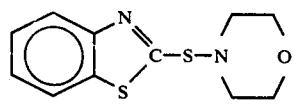

N,N-diisopropyl-2-benzothiazylsulfenamide

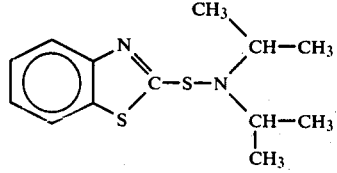

Tertiary butyl-2-benzothiazylsulfenamide

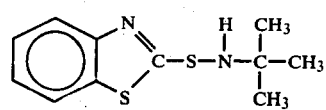

Cyclohexyl-2-benzothiazylsulfenamide

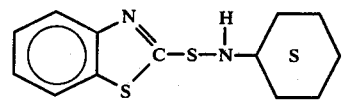

Vulkozit DZ

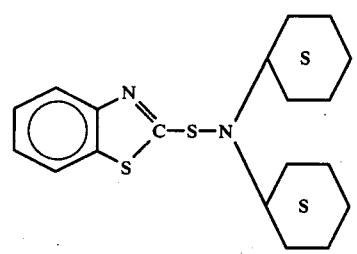

"Thiotax"

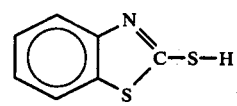

Tetramethyl thiuram monosulfide

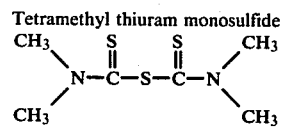

Tetramethyl thiuram disulfide

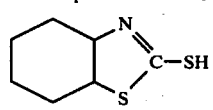

2-mercaptobenzothiazole

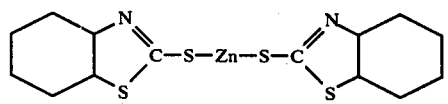

Zinc salt of mercaptobenzothiazole

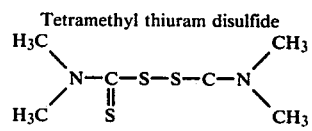

Tetramethyl thiuram disulfide

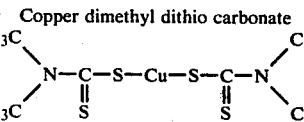

Copper dimethyl dithio carbonate

We may use the accelerator and the phosphate at ratios of from about 0.8:1 to about 4:1 of phosphate to accelerator. While we believe any commercial sulfur-containing accelerator would be satisfactory, the thiazyls, thiurams, and dithio carbonates are preferred.

The phosphate/accelerator composition may be applied to the cord or the wire as a slurry or in a solvent such as trichlorethylene or chloroform. The slurry may be in an oil base such as, for example, corn oil.

Accelerators well known in the art include sulfur-containing thiazyls, thiurams and dithiocarbamates, typically of the general formulas:

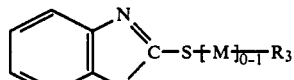

and

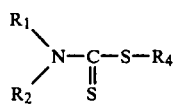

Where $R_1$ and $R_2$ are independently selected from lower alkyl groups, $R_3$ is selected from H and

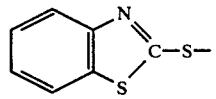

$R_4$ is selected from

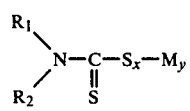

and M is selected from Zn, Cu, Bi, Pb, Se, and Te, X is 0 or 1 and Y is X or X−1.

The phosphates we may use include the inorganic alkali metal and alkaline earth metal meta, pyro and ortho phosphates, i.e. zinc orthophosphates, and the organic phosphates such as tricresylphosphate.

An elementary method of applying a dilute solution of the moderator system in chloroform to the brass-coated steel cord used during our initial experiments consisted simply of wiping the solution onto the cord as it exited from a cord bunching machine (making a helical braid of fine wires) using a contactor stage consisting of a set of captive sponges pressed tightly against the cord. To note if a further improvement could be achieved with larger exposures to this system, several trials were also made using two contactors in series. A second method of application consisted of placing a solution reservoir containing the moderator solution around an idler sheave on the buncher wherein the cord was totally immersed in the solution during treatment.

The benzothiazyldisulfide/tricresylphosphate (MBTS/TCP) moderator solution used in these treatment processes contained 2.0% by weight MBTS (benzothiazyldisulfide), 1.6% TCP, and the balance chloroform. Several experiments also were run using a solution containing half the above MBTS and TCP levels.

The adhesion characteristics of all brass-coated steel cords treated using the moderator solution were tested using standard strip pad procedures. Results of typical strip test data are reproduced in Table I for treated cords. An untreated cord was carried along for comparison purposes. Series I shows test data obtained from pads tested approximately two hours after construction and curing of the pad. Series II lists test data obtained from pads which were tested approximately 16 hours after curing. The adhesion performance was considered satisfactory when the pullout load was in excess of fifty pounds and the coverage in excess of 75%.

All cords treated with the BTDS/TCP moderator system met test specifications; these data further indicate that this system will work satisfactorily over a range of moderator concentrations and that the continuous treatment of brass-plated cord with this moderator system is technically feasible and significantly improves adhesion characteristics of the cord.

Our invention is applicable to any brass-coated tire cord, but it particularly useful with cord having a brass coating weight between about 3 and 8 grams of brass per kilogram of wire, the brass having a copper content of about 60–70%.

TABLE I

Results of Strip Pad Adhesion of Tire Cord in Rubber

| Series I Cord** | (Pads tested approximately 2 hours after curing) Treatment | Pullout Load, pounds | Coverage, percent |
|---|---|---|---|
| 1 | None | 40 | 52 |
| 2 | Standard moderator concentration - single exposure | 62 | 91 |
| 3 | Standard moderator concentration - double exposure | 61 | 91 |
| 4 | One-half standard moderator concentration - single exposure | 59 | 84 |
| 5 | One-half standard moderator concentratioin - double exposure | 58 | 92 |

| Series II Cord | (Pads tested approximately 16 hours after curing) Treatment | Pullout Load, pounds | Coverage, percent |
|---|---|---|---|
| 6 | Standard moderator concentration - single exposure | 53 | 85 |
| 7 | Standard moderator concentration - double exposure | 60 | 94 |
| 8 | One-half standard moderator concentration - double exposure | 69 | 85 |
| 9 | Standard moderator concentration - idler sheave application | 53 | 78 |

**All cords bunched at 170 feet per minute except Cord 3 which was bunched at a rate of 100 feet per minute.

A mercaptobenzothiazole "Thiotax"/TCP moderator system in trichloroethylene (Trichlor) was also investigated.

In the first series of experiments, a mixture consisting of 2 grams of Thiotax and 2 ml of TCP in 100 ml of Trichlor was applied to a commercial cord with sponge contactors. This method of application was used for post treating cord as it exited from a buncher which was operating at a speed of 170 feet per minute.

Results are shown in lines 3 and 5 of Table II.

The final series of experiments was conducted on a Morgan wire drawing machine which was operated at 3500 feet per minute.

To enhance the moderator-cord reaction kinetics, the contactor stage was located in close proximity to the final drawing die such that the hot wire was drawn directly through the reactants. To still further increase the interaction of the wire with the reactants in this series of tests, the dilute Trichlor solutions used in earlier experiments was replaced in turn with dry Thiotax powder, dry MBTS powder, a slurry of Thiotax and TCP, and a slurry of MBTS and TCP.

The untreated cords, treated cords, and cords bunched from wires treated with slurries were fabricated into adhesion strip pads using a commercial rubber formulation believed to be natural rubber containing a significant amount, i.e. about 50% of polybutadiene and SBR synthetic rubber. The results of these strip adhesion tests are shown in Table II. On the basis of a standard acceptable pullout load of at least fifty pounds and a rubber coverage in excess of 75% for suitable adhesion, all the untreated cords (cords 1, 2 and 4) were unsatisfactory. The Table further shows that the post-treated cords (cords 3 and 5) and the cords bunched from wires treated with slurries (cords 8 and 9) satisfied adhesion requirements.

TABLE II

Results of Strip Pad Adhesion Tests of Tire Cord in Rubber

| Cord | Identification | Treatment** | Pullout Load, pounds | Coverage, percent |
|---|---|---|---|---|
| 1 | 66.4% Cu - 3.80 g/kg | None | 42 | 61 |
| 2 | 65% Cu - 5.1 g/kg heavy coating weight | None | 42 | 59 |
| 3 | 65% Cu - 5.1 g/kg heavy coating weight | Post-treated cord (Morgan Buncher) Thiotax + TCP in Trichlor | 53 | 92 |
| 4 | 65.4% Cu - 3.0 g/kg light coating weight | None | 52 | 71 |
| 5 | 65.4% Cu - 3.0 g/kg light coating weight | Post-treated cord (Morgan Buncher) Thiotax + TCP in Trichlor | 56 | 91 |
| 6 | 65.6% Cu - 3.5 g/kg | Post-treated wire (Morgan wire drawing machine) Dry Thiotax powder | 51 | 72 |
| 7 | 65.6% Cu - 3.5 g/kg | Post-treated wire (Morgan wire drawing machine) Dry MBTS Powder | 58 | 74 |
| 8 | 65.6% Cu - 3.5 g/kg | Post-treated wire (Morgan wire drawing machine) Thiotax + TCP slurry | 58 | 79 |
| 9 | 65.6% Cu - 3.5 g/kg | Post-treated wire (Morgan wire drawing machine) MBTS + TCP slurry | 64 | 88 |

**Post-treated cord was bunched at 170 feet per minute and 3500 feet per minute on the Morgan.

Some additional work was performed on a wet wire-drawing machine by passing the wire through a contactor containing the MBTS/TCP slurry. The contactor consisted of a metal box fitted with oversized dies at each end which served as slurry seals on the entrance and exit openings. The contactor was placed approximately one inch from the final drawing die in the Morgan wire-drawing machine.

The results of several preliminary trials showed that a 0.0479-inch entrance die and a 0.0116-inch exit or wiper die in the contactor gave a uniform coverage of the wire and did not present any operating difficulties. The best results in terms of adhesion performance and ease of application using these contactor parameters were obtained with a slurry that consisted of 55 percent TCP, 36 percent MBTS, and 9 percent Trichlor by weight. Fifteen full spools of wire were subsequently drawn using the above process conditions. The wire was strung up on three bunchers, and about 200 meters of cord were produced from each of the three bunchers for adhesion strip pad testing in rubber compound.

Adhesion test strip pads were made with a commercial rubber with the cord produced on the three bunchers and from untreated cord.

These results in Table III show that the cord from the three bunchers had satisfactory adhesion. The data also show that the adhesion of the treated cord was far superior to that of the untreated cord.

Tires built using our invention exhibited 100% adhesion.

TABLE III

Results of Strip Pad Adhesion Tests of MBTS/TCP Treated Tire Cord in Rubber

| | Rubber Lot A | |
|---|---|---|
| Cord Identification | Pullout Load, pounds | Coverage, percent |
| Buncher A | 63 | 87 |
| Buncher B | 65 | 86 |
| Buncher C | 66 | 86 |
| Untreated | 44 | 18 |

Our invention is not restricted to the above specific examples and illustrations. It may be otherwise practiced within the scope of the following claims.

We claim:

1. Method of treating brass-coated steel tire cord to enhance its adhesion to rubber comprising forming a coating thereon of phosphate corrosion inhibitor and a sulfur-containing rubber vulcanization accelerator in a ratio of from about 0.8:1 to about 4:1.

2. Method of claim 1 in which the ratio of phosphate corrosion inhibitor to rubber vulcanization accelerator is from about 2:1 to about 3.5:1.

3. Method of claim 1 wherein the coating is formed by passing brass-coated wire through a slurry of phosphate corrosion inhibitor and accelerator, and forming the wire into a cord.

4. Method of claim 1 wherein the coating is formed by passing cord through a solution of phosphate corrosion inhibitor and accelerator in chloroform.

5. Method of claim 1 wherein the coating is formed by passing cord through a solution of phosphate corrosion inhibitor and accelerator in benzene or trichloroethylene.

6. Method of claim 1 in which the accelerator is a sulfur-containing thiazyl, thiuram, or dithiocarbamate.

7. Method of claim 1 in which the phosphate corrosion inhibitor is tricresylphosphate.

8. Brass-coated tire cord having on its surface a film of phosphate corrosion inhibitor and a sulfur-containing rubber accelerator.

9. Tire cord of claim 8 in which the phosphate corrosion inhibitor is tricresylphosphate.

10. Tire cord of claim 8 in which the sulfur-containing rubber accelerator is selected from the group consisting of

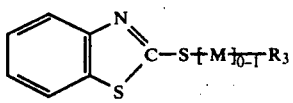

and

-continued

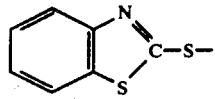

where $R_1$ and $R_2$ are independently selected from lower alkyl groups, $R_3$ is selected from H and

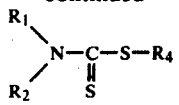

$R_4$ is selected from

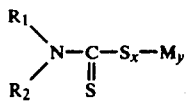

and M is selected from Zn, Cu, Bi, Pb, Se, and Te, X is 0 or 1 and Y is X or X−1.

* * * * *